United States Patent
Cheon (10) Patent No.: US 11,788,835 B2
(45) Date of Patent: Oct. 17, 2023

(54) APPARATUS FOR MEASURING SAMPLE THICKNESS AND METHOD FOR MEASURING SAMPLE THICKNESS

(71) Applicant: Samsung Display Co., Ltd., Yongin-Si (KR)

(72) Inventor: Seonghyeon Cheon, Gwacheon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 1124 days.

(21) Appl. No.: 16/412,706

(22) Filed: May 15, 2019

(65) Prior Publication Data

US 2020/0049496 A1    Feb. 13, 2020

(30) Foreign Application Priority Data

Aug. 13, 2018    (KR) .................. 10-2018-0094214

(51) Int. Cl.
| | |
|---|---|
| *G01B 17/02* | (2006.01) |
| *F25D 19/00* | (2006.01) |
| *G01N 29/07* | (2006.01) |
| *G01N 29/32* | (2006.01) |

(52) U.S. Cl.
CPC .......... *G01B 17/025* (2013.01); *F25D 19/00* (2013.01); *G01B 17/02* (2013.01); *G01N 29/07* (2013.01); *G01N 29/32* (2013.01); *G01N 29/326* (2013.01); *G01N 2291/0234* (2013.01); *G01N 2291/02854* (2013.01); *G01N 2291/048* (2013.01); *G01N 2291/101* (2013.01); *G01N 2291/102* (2013.01)

(58) Field of Classification Search
CPC ...... G01B 17/025; G01B 17/02; G01N 29/07; G01N 29/32; G01N 29/326; G01N 2291/0234; G01N 2291/02854; G01N 2291/048; G01N 2291/102; G01N 2291/101; F25D 19/00
See application file for complete search history.

(56) References Cited

U.S. PATENT DOCUMENTS

| | | | | |
|---|---|---|---|---|
| 3,104,543 A | * | 9/1963 | Kaminski | G01N 29/04 |
| | | | | 73/571 |
| 5,637,812 A | * | 6/1997 | Baker | G01M 7/02 |
| | | | | 73/571 |
| 6,668,650 B1 | * | 12/2003 | Lafleur | G01M 7/00 |
| | | | | 73/579 |

(Continued)

FOREIGN PATENT DOCUMENTS

| | | |
|---|---|---|
| CN | 1727118 A | 2/2006 |
| CN | 1928493 A | 3/2007 |

(Continued)

OTHER PUBLICATIONS

Chinese Office Action corresponding to Application No. 201910743661.6 and dated Sep. 15, 2022, 10 pages.

*Primary Examiner* — Lisa M Caputo
*Assistant Examiner* — Rose M Miller
(74) *Attorney, Agent, or Firm* — Innovation Counsel LLP (57) ABSTRACT

An apparatus for measuring thickness includes: a chamber; a sound wave transmitter transmitting a sound wave in the chamber; a sound wave receiver receiving the sound wave transmitted from the sound wave transmitter in the chamber; and a supporter between the sound wave transmitter and the sound wave receiver.

19 Claims, 7 Drawing Sheets

(56) References Cited

U.S. PATENT DOCUMENTS

| | | | |
|---|---|---|---|
| 7,013,732 B2 * | 3/2006 | McKeon | G01N 29/28 73/644 |
| 7,197,426 B2 | 3/2007 | Park et al. | |
| 8,139,232 B2 | 3/2012 | Wolf et al. | |
| 8,699,027 B2 | 4/2014 | Wolf et al. | |
| 9,341,602 B2 | 5/2016 | Smith et al. | |
| 2004/0016120 A1 | 1/2004 | Boland et al. | |
| 2006/0070445 A1 * | 4/2006 | Juber | G01N 29/11 73/571 |
| 2011/0177603 A1 * | 7/2011 | Ninomiya | G01N 29/043 422/62 |
| 2012/0186348 A1 | 7/2012 | Matsumoto et al. | |
| 2012/0292578 A1 | 11/2012 | Bacher et al. | |
| 2012/0308807 A1 | 12/2012 | Edwards | |
| 2014/0375983 A1 | 12/2014 | Wolf et al. | |

FOREIGN PATENT DOCUMENTS

| | | | |
|---|---|---|---|
| CN | 201340258 Y | | 11/2009 |
| CN | 102620693 A | | 8/2012 |
| CN | 102506780 B | | 11/2013 |
| CN | 102798671 B | | 11/2014 |
| CN | 206671261 U | | 11/2017 |
| CN | 107504926 A | | 12/2017 |
| CN | 107747923 A | | 3/2018 |
| CN | 107941179 A | | 4/2018 |
| CN | 207730321 U | | 8/2018 |
| JP | 04313010 A | * | 11/1992 |
| JP | 2006038744 A | | 2/2006 |
| JP | 5133108 B2 | * | 1/2013 |
| JP | 2017-0075866 A | | 4/2017 |
| KR | 10-1999-0054756 A | | 7/1999 |
| KR | 10-0568703 B1 | | 4/2006 |
| KR | 10-2014-0040692 A | | 4/2014 |
| KR | 10-2014-0091099 A | | 7/2014 |

\* cited by examiner

APPARATUS FOR MEASURING SAMPLE THICKNESS AND METHOD FOR MEASURING SAMPLE THICKNESS

CROSS-REFERENCE TO RELATED APPLICATION

This application claims priority under 35 U.S.C. § 119 to Korean Patent Application No. 10-2018-0094214, filed on Aug. 13, 2018, in the Korean Intellectual Property Office (KIPO), the disclosure of which is incorporated by reference herein in its entirety.

1. TECHNICAL FIELD

Embodiments of the present inventive concept relate to an apparatus for measuring thickness and a method for measuring thickness.

2. DISCUSSION OF RELATED ART

Examples of methods for measuring thickness may include a direct measurement method, an optical method, an X-ray method, and an ultrasonic wave method. However, conventional methods for measuring thickness may cause problems such as damage to an object to be measured and environmental safety issues due to radioactivity, and it is difficult to accurately measure the thickness of the object to be measured that has a relatively large thickness.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY

Aspects of embodiments of the present inventive concept may be directed to an apparatus for measuring thickness and a method for measuring thickness that are capable of measuring thickness accurately.

According to an embodiment, an apparatus for measuring thickness includes: a chamber; a sound wave transmitter transmitting a sound wave in the chamber; a sound wave receiver receiving the sound wave transmitted from the sound wave transmitter in the chamber; and a supporter between the sound wave transmitter and the sound wave receiver.

The apparatus for measuring thickness may further include a thermometer in the chamber.

The apparatus for measuring thickness may further include a cooler for cooling the chamber.

An inner wall of the chamber may include a sound absorbing material.

The apparatus for measuring thickness may further include a controller. The controller may be connected to the sound wave transmitter, the sound wave receiver, the thermometer, and the cooler, control synchronization of the sound wave transmitter and the sound wave receiver, and control the cooler according to a temperature signal received from the thermometer.

The sound wave transmitter may be spaced apart from the sound wave receiver by a predetermined distance.

The sound wave transmitter may transmit a sound wave having an audible frequency, and the sound wave receiver may receive the sound wave having an audible frequency.

The supporter may be spaced apart from the sound wave receiver by a predetermined distance.

The supporter may have a hole located corresponding to the sound wave transmitter and the sound wave receiver.

The cooler may include at least one of liquid nitrogen ($LN_2$), liquid oxygen ($LO_2$), liquid argon (LAr), liquid hydrogen ($LH_2$), and liquid helium ($LHe_2$).

According to an embodiment, a method for measuring thickness includes: cooling a chamber to have a temperature equal to or lower than a predetermined temperature; transmitting a sound wave using a sound wave transmitter; receiving the sound wave transmitted by the sound wave transmitter using a sound wave receiver; and calculating a thickness of a film based on a time difference between the transmitting the sound wave by the sound wave transmitter and the receiving the transmitted sound wave by the sound wave receiver, and the temperature of the chamber, wherein the predetermined temperature is about minus 170 degrees Celsius.

An inner wall of the chamber may include a sound absorbing material.

The sound wave transmitter may be spaced apart from the sound wave receiver by a predetermined distance.

The sound wave transmitter may transmit a sound wave having an audible frequency, and the sound wave receiver may receive the sound wave having an audible frequency.

According to an embodiment, an apparatus for measuring thickness includes: a chamber; a sound wave transmission and receiver transmitting a sound wave and receiving the sound wave in the chamber; a thermometer in the chamber; a cooler for cooling the chamber; and a controller connected to the sound wave transmission and receiver, the thermometer, and the cooler, and controlling the cooler according to a temperature signal received from the thermometer. An inner wall of the chamber includes a sound absorbing material.

The sound wave transmission and receiver may transmit and receive a sound wave having an audible frequency.

The apparatus for measuring thickness may further include a supporter disposed opposing the sound wave transmission and receiver. The supporter may be spaced apart from the sound wave transmission and receiver by a predetermined distance.

According to an embodiment, a method for measuring thickness includes: cooling a chamber to have a temperature equal to or lower than a predetermined temperature; measuring a temperature of a chamber which has been cooled; transmitting a sound wave and receiving the sound wave using a sound wave transmitter; and calculating a thickness of a metal film based on a time difference between the transmitting the sound wave by the sound wave transmitter and the receiving the transmitted sound wave by the sound wave transmitter, and the temperature of the chamber. The predetermined temperature is about minus 170 degrees.

An inner wall of the chamber may include a sound absorbing material.

The chamber may be surrounded by a cooler.

The foregoing is illustrative only and is not intended to be in any way limiting. In addition to the illustrative aspects, embodiments and features described above, in addition aspects, embodiments and features will become apparent by reference to the drawings and the following detailed description.

BRIEF DESCRIPTION OF THE DRAWINGS

A more complete appreciation of the present inventive concept will become more apparent by describing in detail embodiments thereof with reference to the accompanying drawings, wherein.

DETAILED DESCRIPTION

Embodiments will now be described more fully hereinafter with reference to the accompanying drawings. Although the inventive concept may be modified in various manners and have several embodiments, embodiments are illustrated in the accompanying drawings and will be mainly described in the specification. However, the scope of the inventive concept is not limited to the embodiments and should be construed as including all the changes, equivalents and substitutions included in the spirit and scope of the inventive concept.

In the drawings, thicknesses of a plurality of layers and areas are illustrated in an enlarged manner for clarity and ease of description thereof. When a layer, area, or plate is referred to as being "on" another layer, area, or plate, it may be directly on the other layer, area, or plate, or intervening layers, areas, or plates may be present therebetween. Conversely, when a layer, area, or plate is referred to as being "directly on" another layer, area, or plate, intervening layers, areas, or plates may be absent therebetween. In addition when a layer, area, or plate is referred to as being "below" another layer, area, or plate, it may be directly below the other layer, area, or plate, or intervening layers, areas, or plates may be present therebetween. Conversely, when a layer, area, or plate is referred to as being "directly below" another layer, area, or plate, intervening layers, areas, or plates may be absent therebetween.

The spatially relative terms "below", "beneath", "lower", "above", "upper" and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device located "below" or "beneath" another device may be placed "above" another device. Accordingly, the illustrative term "below" may include both the lower and upper positions. The device may also be oriented in the other direction and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be in addition understood that the terms "comprises," "including," "includes" and/or "including," when used in this specification, specify the presence of stated features, integers, steps, operations, elements and/or components, but do not preclude the presence or addition of one or more other features, integers, steps, operations, elements, components and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of variation for the particular value as determined by one of ordinary skill in the art, considering the measurement in question and the error associated with measurement of the particular quantity (i.e., the limitations of the measurement system). For example, "about" may mean within one or more standard variations, or within ±30%, 20%, 10%, 5% of the stated value.

Unless otherwise defined, all terms used herein (including technical and scientific terms) have the same meaning as commonly understood by those skilled in the art to which this inventive concept pertains. It will be in addition understood that terms, such as those defined in commonly used dictionaries, should be interpreted as having a meaning that is consistent with their meaning in the context of the relevant art and will not be interpreted in an ideal or excessively formal sense unless clearly defined in the present specification.

Some of the parts which are not associated with the description may not be provided in order to in specific describe embodiments of the present inventive concept and like reference numerals refer to like elements throughout the specification.

Hereinafter, an apparatus for measuring thickness according to a first embodiment will be described in detail with reference to FIGS. 1 and 2.

Figure 1:
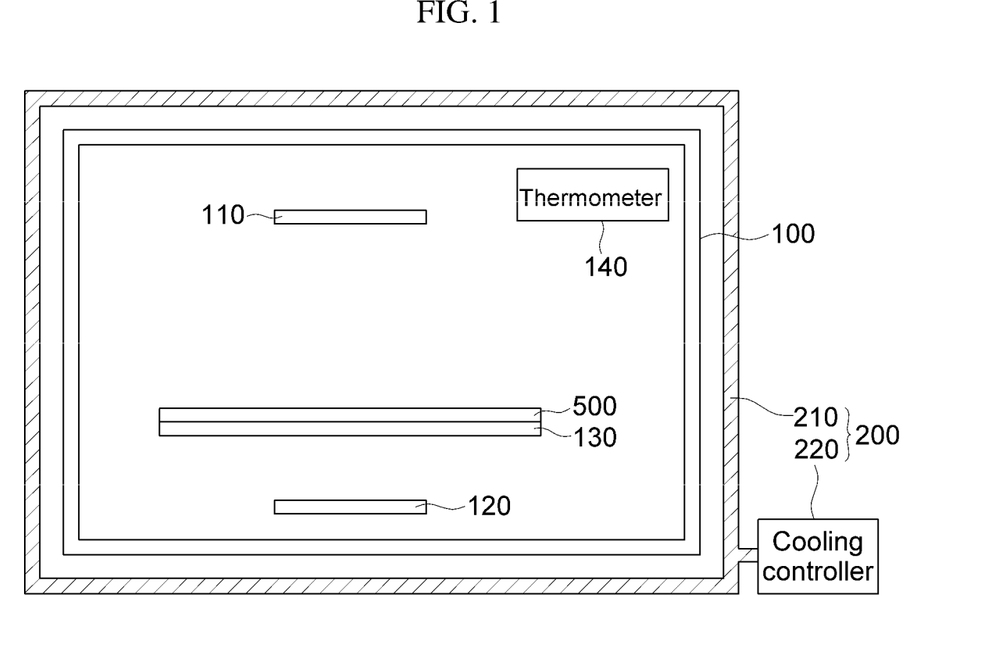
FIG. 1 is a view illustrating an apparatus for measuring thickness according to an embodiment.
Figure 2:
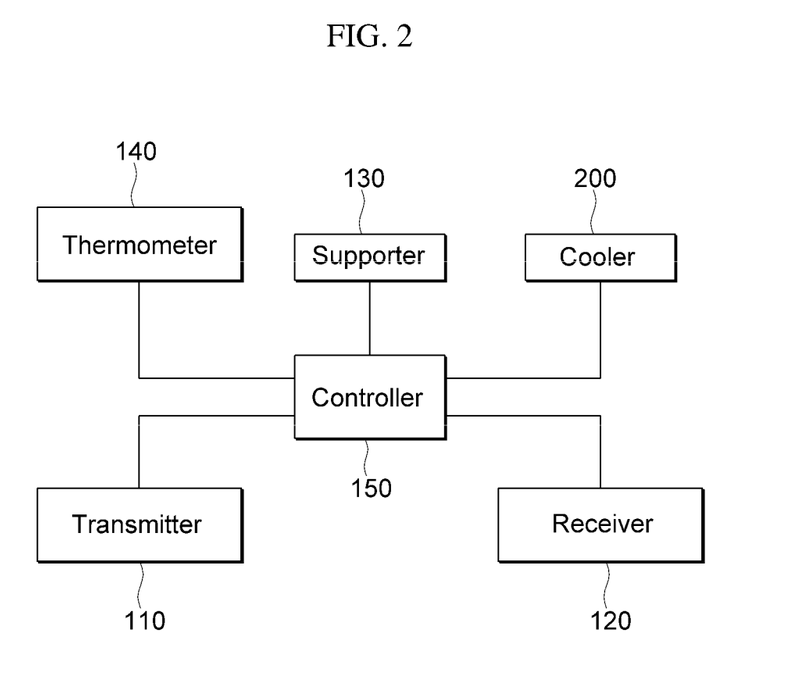
FIG. 2 is a block diagram illustrating an apparatus for measuring thickness according to an embodiment.

FIG. 1 is a view illustrating an apparatus for measuring thickness according to an embodiment, and FIG. 2 is a block diagram illustrating an apparatus for measuring thickness according to an embodiment.

Referring to FIGS. 1 and 2, an apparatus for measuring thickness according to a first embodiment includes a chamber 100, a sound wave transmitter 110, a sound wave receiver 120, a supporter 130, a thermometer 140, a controller 150, and a cooler 200.

The chamber 100 accommodates the sound wave transmitter 110, the sound wave receiver 120, the supporter 130, and the thermometer 140.

An inner wall of the chamber 100 may include a sound absorbing material. The inner wall of the chamber 100 that includes a sound absorbing material may absorb sound waves transmitted from the sound wave transmitter 110. In other words, some of sound waves that are transmitted from the sound wave transmitter 110, except sound waves that proceed along a shortest path from the sound wave transmitter 110 to the sound wave receiver 120, are absorbed by the sound absorbing material included in the inner wall of the chamber 100. Accordingly, an apparatus for measuring thickness according to a first embodiment may measure a thickness of an object, for example, a metal film 500 more accurately by reducing noise generation caused by the sound waves transmitted from the sound wave transmitter 110.

The chamber 100 may be filled with an air or a specific gas thereinside. Depending on the gas filled in the chamber 100, a propagation velocity of the sound wave may vary, which will be described in detail below with reference to FIGS. 3 to 6.

The sound wave transmitter 110 may be disposed at one side of the supporter 130, for example, an upper portion of the chamber 100.

The sound wave transmitter 110 may generate a sound wave and transmit it into the chamber 100. In such an embodiment, the sound wave may be an ultrasonic wave having a frequency of about 20,000 Hz or more, or may be an infrasonic wave having a very low frequency about 20 Hz or less. In addition, the sound wave may be a sound wave having an audible frequency of about 20 Hz or more and about 20,000 Hz or less.

The sound wave receiver 120 may be disposed at the other side of the supporter 130, for example, a lower portion of the chamber 100. In such an embodiment, the sound wave receiver 120 is spaced apart from the sound wave transmitter 110 and opposes the sound wave transmitter 110. Specifically, the sound wave receiver 120 is spaced apart from the sound wave transmitter 110 by a predetermined distance (D1 in FIG. 4).

The sound wave receiver 120 may receive sound waves transmitted from the sound wave transmitter 110. In particular, the sound wave receiver 120 may receive sound waves that are transmitted along a shortest path from the sound wave transmitter 110 to the sound wave receiver 120.

Upon receiving the sound wave, the sound wave receiver 120 transmits a sound wave reception signal to the controller 150.

The sound wave receiver 120 may be synchronized with the sound wave transmitter 110 such that the time difference between transmitting the sound wave by the sound wave transmitter 110 and receiving the transmitted sound wave by the sound wave receiver 120 may be accurately measured.

The sound wave receiver 120 may move horizontally together with the sound wave transmitter 110. Accordingly, the thickness may be measured regardless of the position of the metal film 500.

Although not illustrated in the drawings, a plurality of sound wave transmitters 110 and a plurality of sound wave receivers 120 may be disposed in the chamber 100, in order to measure the thickness of the metal film 500 at various positions.

The supporter 130 may be disposed between the sound wave transmitter 110 and the sound wave receiver 120, and may be disposed opposing each of the sound wave transmitter 110 and the sound wave receiver 120.

The supporter 130 supports the metal film 500 of which a thickness is to be measured. The sound wave transmitted from the sound wave transmitter 110 may pass through the metal film 500 disposed on the supporter 130 or the supporter 130 and the sound wave which pass through the metal film 500 or the supporter 130 is received by the sound wave receiver 120. In such an embodiment, the sound wave that passes through the supporter 130 may have a velocity different from a velocity of the sound wave that does not pass through the supporter 130. For example, the sound wave that passes through the supporter 130 may have a velocity greater than a velocity of the sound wave that does not pass through the supporter 130. Although not illustrated, a substrate on which the metal film 500 is disposed may be positioned between the supporter 130 and the metal film 500. In such an embodiment, the thickness of the metal film 500 may be calculated in consideration of a thickness of the substrate on which the metal film 500 is disposed and a velocity of the sound wave in a material included in the substrate.

The supporter 130 moves horizontally with the metal film 500, disposed on the supporter 130 to measure the thickness of the metal film 500 regardless of the position of the metal film 500.

The supporter 130 may have a hole in at least a portion thereof. The hole may be positioned corresponding to the sound wave transmitter 110 and the sound wave receiver 120. When the sound wave transmitter 110 transmits the sound wave, the sound wave receiver 120 receives the sound wave and the thickness of the metal film 500 is measured. In specific, when the thickness of the metal film 500 is measured, the hole may be positioned corresponding to a shortest path from the sound wave transmitter 110 to the sound wave receiver 120. Accordingly, the sound wave that proceeds along the shortest path from the sound wave transmitter 110 to the sound wave receiver 120 among the sound waves transmitted from the sound wave transmitter 110 does not pass through the supporter 130, and thus the thickness of the metal film 500 may be measured more accurately.

Although not illustrated in the drawings, a substrate on which the metal film 500 is formed may be further disposed between the supporter 130 and the metal film 500. The substrate may include a material and have a thickness such that the sound wave may be transmitted therethrough. For example, the substrate may include glass having a thickness of about 0.5 T.

The thermometer 140 may be disposed in the chamber 100. Although it is depicted in FIG. 1 that the thermometer 140 is disposed at an upper portion of and in the chamber 100, embodiments are not limited thereto. In an embodiment, the thermometer 140 may be disposed at a lower portion or a central portion of and in the chamber 100. However, the thermometer 140 may not be disposed at the shortest path from the sound wave transmitter 110 to the sound wave receiver 120.

The thermometer 140 may measure a temperature of the metal film 500 to measure the thickness of the metal film 500 more accurately. In such an embodiment, in order to measure the thickness of the metal film 500 more accurately, the thermometer 140 may move to measure the temperature of the metal film 500. As the temperature increases, a velocity of a sound wave increases, and a thickness resolution of the apparatus for measuring thickness decreases, which will be described in detail below with reference to FIGS. 3 to 6.

The controller 150 is connected to each of the sound wave transmitter 110, the sound wave receiver 120, the supporter 130, the thermometer 140, and the cooler 200.

The controller 150 is connected to each of the sound wave transmitter 110 and the sound wave receiver 120 to control synchronization of the sound wave transmitter 110 and the sound wave receiver 120.

The controller 150 may be connected to the sound wave transmitter 110, the sound wave receiver 120, and the supporter 130 to control horizontal movement of the sound wave transmitter 110, the sound wave receiver 120, and the supporter 130.

The controller 150 may control the cooler 200 according to a temperature control signal received from the thermometer 140 to adjust a temperature in the chamber 100.

The controller 150 receives the sound wave reception signal from the sound wave receiver 120.

The controller 150 calculates the thickness of the metal film 500 based on the time between transmitting the sound wave by the sound wave transmitter 110 and receiving the transmitted sound wave by the sound wave receiver 120, which will be described in detail below with reference to FIGS. 3 to 6.

The cooler 200 may include a gas pipe 210 and a cooling controller 220.

The gas pipe 210 may be disposed so as to closely contact an outer surface of the chamber 100 and surround outside of the chamber 100. An ultra-low temperature gas (i.e., cryogenic gas) flows through the gas pipe 210 to cool inside of the chamber 100. Specifically, the ultra-low temperature gas may include various types of gases that exist in the state of gas at extremely low temperatures of about minus 170 degrees Celsius (170° C.) or less, e.g., liquid nitrogen ($LN_2$), liquid oxygen ($LO_2$), liquid argon (LAr), liquid hydrogen ($LH_2$), and liquid helium ($LHe_2$).

The cooling controller 220 may be located outside the chamber 100. The cooling controller 220 may be connected to the gas pipe 210 and supply the ultra-low temperature gas to the gas pipe 210 to cool the chamber 210 to an ultra-low temperature. For example, the temperature inside the chamber 100 after cooling may be about minus 170° C. or less.

Although not illustrated, the cooling controller 220 may include a gas regulator, a gas valve, a gas storage tank, and the like for supplying the ultra-low temperature gas to the gas pipe 210. The gas regulator is configured to finely regulate a flow rate of the ultra-low temperature gas and may be a flow control device such as a mass flow meter. The gas valve is a valve for regulating the opening and closing of the gas storage tank and the gas storage tank stores the ultra-low temperature gas.

However, the cooler 200 is not limited thereto, and may have various forms to lower the temperature in the chamber 100.

Hereinafter, a method for measuring thickness according to a second embodiment will be described in detail with reference to FIGS. 3 to 6.

Figure 3:
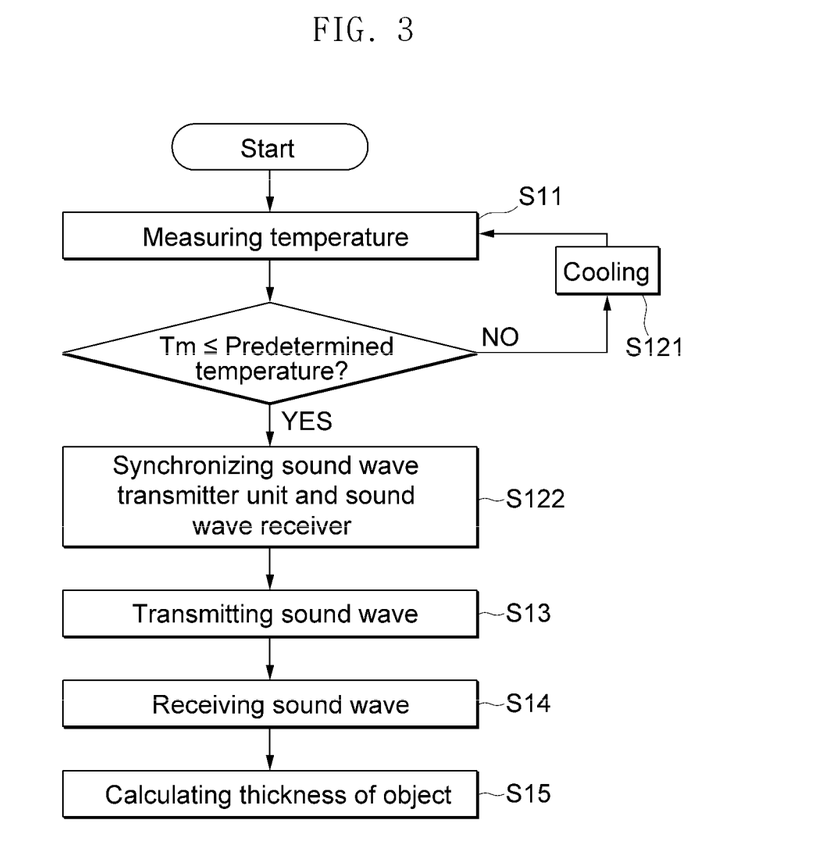
FIG. 3 is a flowchart illustrating a method for measuring thickness according to an embodiment.
Figure 4:
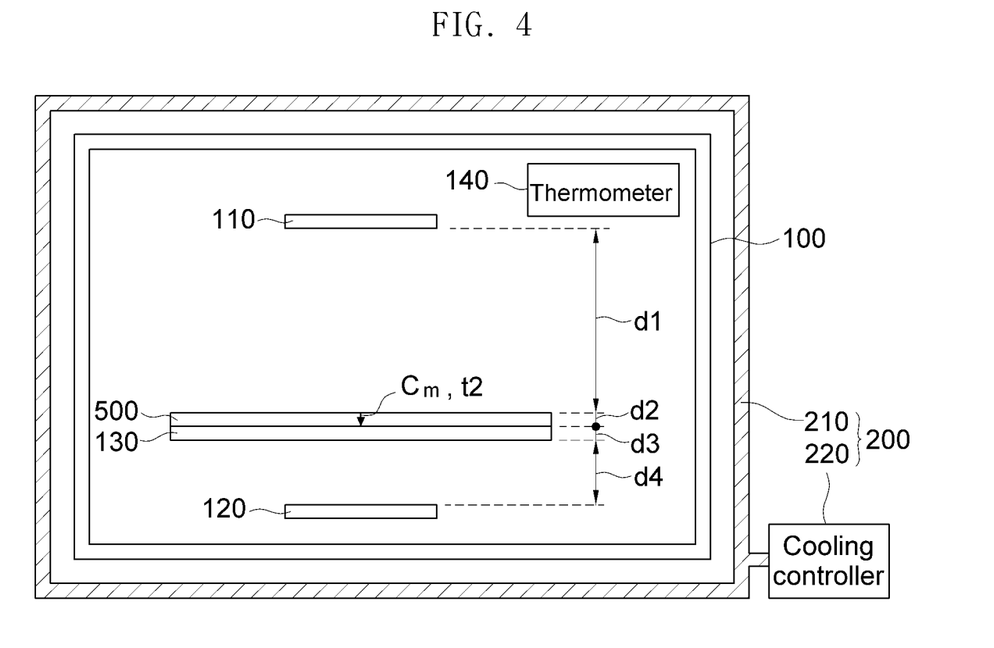
FIGS. 4, 5 and 6 are views illustrating a method for measuring thickness according to an embodiment.
Figure 5:
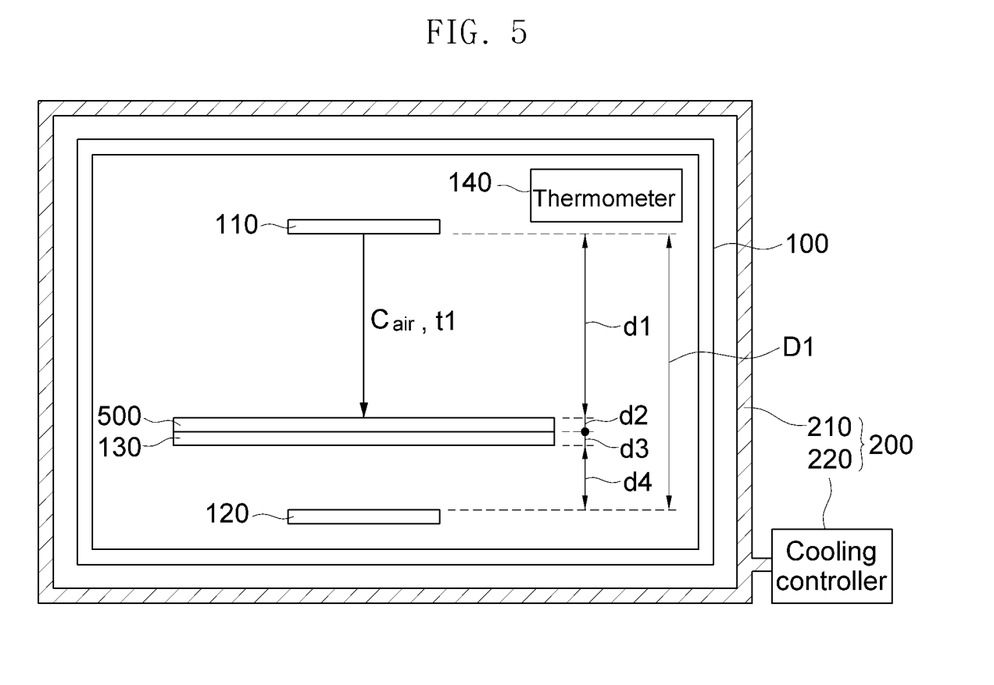
Figure 6:
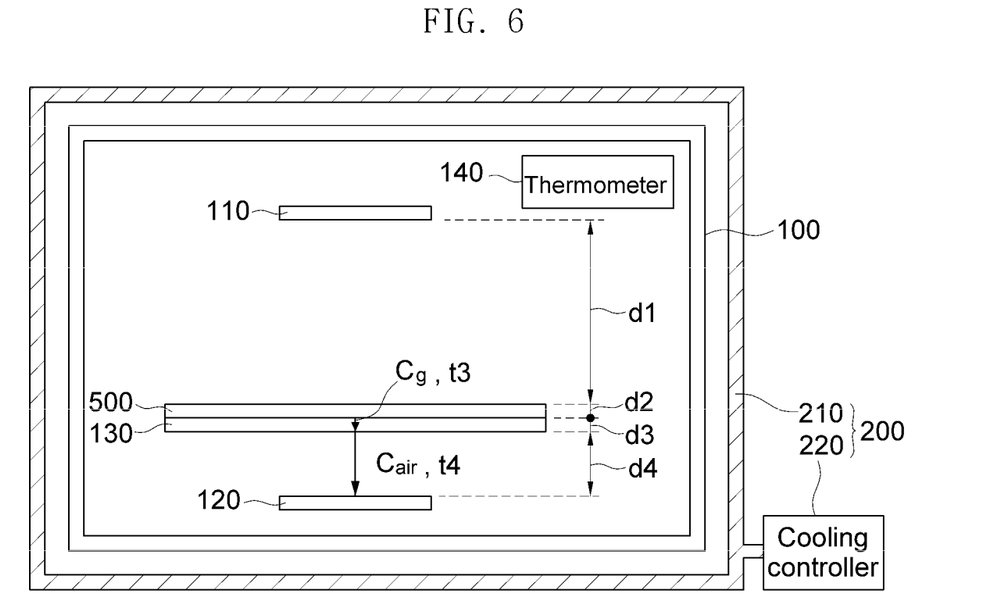

FIG. 3 is a flowchart illustrating a method for measuring thickness according to a second embodiment, and FIGS. 4 to 6 are views illustrating a method for measuring thickness according to a second embodiment.

Referring to FIGS. 3 and 4, first, a temperature inside the chamber 100 is measured (S11). In such a case, a temperature of the metal film 500 as well as the temperature inside the chamber 100 may be measured.

When the measured temperature (Tm) of the inside of the chamber 100 is higher than a predetermined temperature, the controller 150 transmits a temperature control signal to the cooler 200 in order to cool the inside of the chamber 100 and the metal film 500. According to the temperature control signal received from the controller 150, the cooler 200 cools the inside of the chamber 100 (S121). Specifically, when the measured temperature of the inside of the chamber 100 is substantially equal to or higher than about minus 170° C., the controller 150 transmits the temperature control signal to the cooling controller 220. According to the temperature control signal received from the controller 150, the cooling controller 220 controls the gas regulator and the gas valve to supply the ultra-low temperature gas stored in the gas storage tank to the gas pipe 210 surrounding the chamber 100, thereby cooling the inside of the chamber 100 and the metal film 500.

When the measured temperature (Tm) of the inside of the chamber 100 is equal to or lower than a predetermined temperature, the controller 150 synchronizes the sound wave transmitter 110 and the sound wave receiver 120 (S122). For example, the predetermined temperature may be substantially equal to or less than about minus 170° C.

The controller 150 synchronizes the sound wave transmitter 110 and the sound wave receiver 120, and then the sound wave transmitter 110 transmits sound waves (S13).

Since a thickness d2 of the metal film is calculated on the basis of a sound wave that proceeds along a shortest path D1 from the sound wave transmitter 110 to the sound wave receiver 120, the description hereinbelow is given with respect to the path of such a sound wave. In such an embodiment, a distance D1 from the sound wave transmitter 110 to the sound wave receiver 120, as represented by the following Equation 1, is a sum of a distance d1 between the sound wave transmitter 110 and an upper surface of the metal film 500, the thickness d2 of the metal film 500, and a distance d3 between a lower portion of the metal film 500 and the sound wave receiver 120, and has a constant value.

$$D1 = d1 + d2d3 + d4 \qquad \text{[Equation 1]}$$

As illustrated in FIG. 4, a soundwave that is transmitted from the sound wave transmitter 110 travels the distance d1 between the sound wave transmitter 110 and the upper surface of the metal film 500 for a first period in time t1 at a velocity Cair of the sound wave in the air.

In such an embodiment, a velocity Cgas of the sound wave in a gas may be represented by the following Equation 2.

$$C_{gas} = \sqrt{\frac{K}{\rho}} \cong \sqrt{\frac{273\gamma R}{m}} \left(1 + \frac{T}{2 \times 273}\right) \qquad \text{[Equation 2]}$$

In Equation 2, K is a gas expansion coefficient of an ideal gas, ρ is a density, γ is a specific heat ratio, R is a gas constant, m is a molecular weight, and T is a temperature. The gas expansion coefficient, the specific heat ratio and the molecular weight may have values that depend on the type of gas. According to Equation 2, a velocity Cgas of propagation of a sound wave in a gas may vary depending on the temperature and the type of the gas. For example, depending on the temperature and the type of gases, velocity of sound waves may vary as shown in the following Table 1.

TABLE 1

| Type of gas | Temperature (° C.) | Speed (m/s) |
| --- | --- | --- |
| Carbon dioxide | 18 | 265.8 |
| Water vapor | 100 | 404.8 |
| Glass | 20 | 5440 |
| Air | 20 | 343 |
| Helium | 20 | 965 |

As illustrated in FIG. 5, the sound wave that has travelled the distance d1 from the sound wave transmitter 110 to the upper surface of the metal film 500 passes through the metal film 500 for a second period in time t2 at a velocity Cm of a sound wave in a material included in the metal film 500.

In such an embodiment, a velocity Csolid of propagation of a sound wave in a solid may be represented by the following Equation 3.

$$C_{solid} = \sqrt{\frac{E(1-\sigma)}{\rho(1+\sigma)(1-2\sigma)}}$$ [Equation 3]

In Equation 3, E is the Young's modulus, σ is the Poisson's ratio, and ρ is a density. In this case, the Young's modulus and Poisson's ratio have different values depending on the material, and the density may have different values depending on the temperature. According to the above Equation 3, a velocity Csolid of propagation of a sound wave in a solid may vary depending on the temperature and the type of the solid.

As illustrated in FIG. 6, the sound wave that has passed through the metal film 500 travels a distance d3 between the lower portion of the metal film 500 and the sound wave receiver 120 for a third period in time t3 at a velocity Cair of the sound wave in the air.

In such an embodiment, since the inner wall of the chamber 100 of the apparatus for measuring thickness according to a first embodiment includes a sound absorbing material, a sound wave transmitted from the sound wave transmitter 110 is absorbed in the inner wall of the chamber 100. Accordingly, noise generation caused by sound waves transmitted from the sound wave transmitter 110 may be reduced, and the thickness of the metal film 500 may be calculated more accurately.

The sound wave receiver 120 receives the sound wave transmitted from the sound wave transmitter 110 (S14).

The thickness of the metal film 500 is calculated based on the sound wave received at the sound wave receiver 120 (S15). Particularly, in order to calculate the thickness of the metal film 500 accurately, the thickness of the metal film 500 is calculated on the basis of a sound wave that proceeds along a shortest path from the sound wave transmitter 110 to the sound wave receiver 120. More specifically, the controller 150 calculates the thickness d2 of the metal film 500 based on a shortest time tmin it takes for a sound wave to proceed along a shortest path from the sound wave transmitter 110 to the sound wave receiver 120. In such a case, the thickness d2 of the metal film 500 is calculated according to the above-described Equation 1 or the following Equation 4.

$$t_{min} = \frac{d1}{C_{air}} + \frac{d2}{C_m} + \frac{d3}{C_{air}}$$ [Equation 4]

According to first and second embodiments of the present inventive concept, since a velocity of a sound wave decreases, as the temperature inside the chamber 100 and the temperature of the metal film 500 decrease, a thickness resolution of the apparatus for measuring thickness increases. Accordingly, as the temperature inside the chamber 100 and the temperature of the metal film 500 decrease, the thickness of the metal film 500 may be measured more accurately.

Hereinafter, an apparatus for measuring thickness according to a third embodiment will be described in detail with reference to FIGS. 7 and 8.

Figure 7:
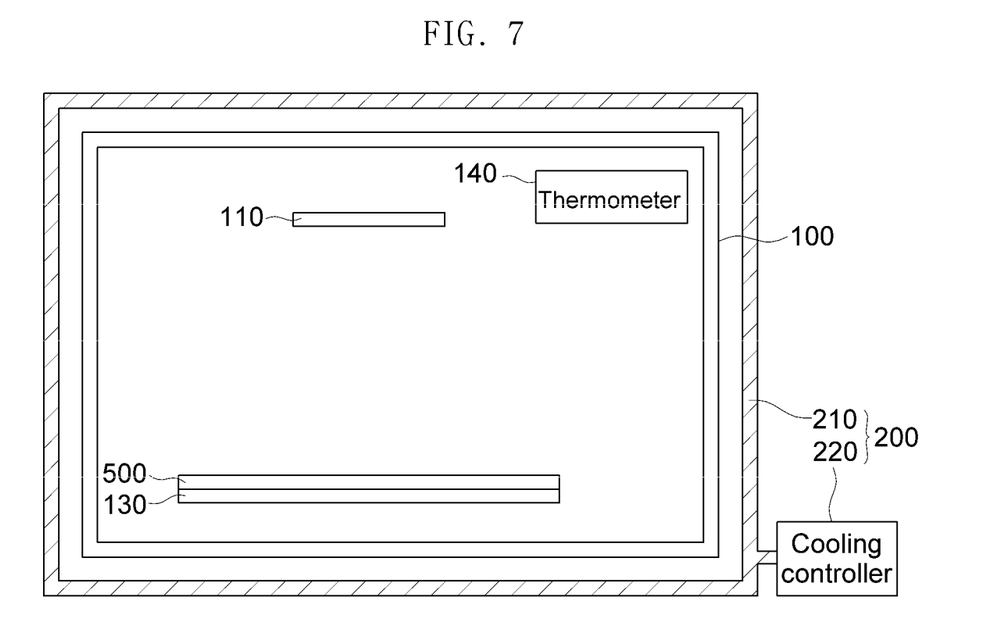
FIG. 7 is a view illustrating an apparatus for measuring thickness according to another embodiment.
Figure 8:
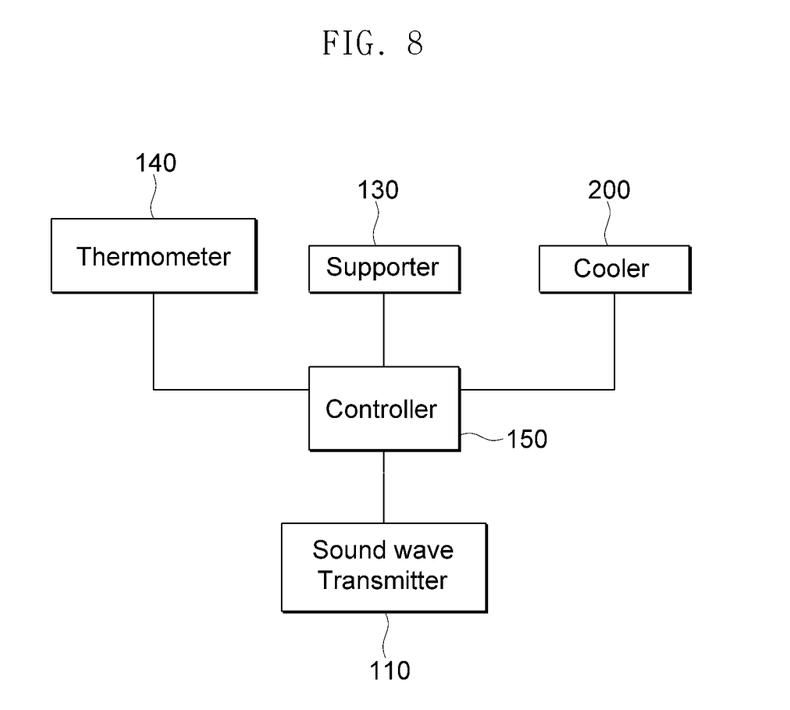
FIG. 8 is a block diagram illustrating an apparatus for measuring thickness according to another embodiment.

FIG. 7 is a view illustrating an apparatus for measuring thickness according to another embodiment, and FIG. 8 is a block diagram illustrating an apparatus for measuring thickness according to another embodiment.

Referring to FIGS. 7 and 8, an apparatus for measuring thickness according to a third embodiment includes a chamber 100, a sound wave transmitter 110, a supporter 130, a thermometer 140, a controller 150, and a cooler 200.

The chamber 100 accommodates the sound wave transmitter 110, the supporter 130, and the thermometer 140.

An inner wall of the chamber 100 may include a sound absorbing material. The inner wall of the chamber 100 that includes a sound absorbing material may absorb sound waves transmitted from the sound wave transmitter 110. In other words, some of sound waves that are transmitted from the sound wave transmitter 110, except sound waves that proceed along a shortest path from the sound wave transmitter 110 to the metal film 500 or the supporter 130, are absorbed by the sound absorbing material included in the inner wall of the chamber 100. Accordingly, an apparatus for measuring thickness according to a third embodiment may measure a thickness (see "d2" in FIG. 4) of a metal film 500 more accurately by reducing noise generation caused by the sound waves transmitted from the sound wave transmitter 110.

The chamber 100 may be filled with an air or a specific gas thereinside. Depending on the gas filled in the chamber 100, a propagation velocity of the sound waves may vary.

The sound wave transmitter 110 may be disposed at an upper portion of and in the chamber 100.

The sound wave transmitter 110 may generate a sound wave and transmit it into the chamber 100. In such an embodiment, the sound wave may be an ultrasonic wave having a frequency of about 20,000 Hz or more, or may be an infrasonic wave having a very low frequency about 20 Hz or less. In addition, the sound wave may be a sound wave having an audible frequency of about 20 Hz or more and about 20,000 Hz or less.

The sound wave transmitter 110 may receive a sound wave that proceeds along a shortest path while being transmitted from the sound wave transmitter 110, reflected from the metal film 500, and received by the sound wave transmitter 110. Upon receiving the sound wave, the sound wave transmitter 110 transmits a sound wave reception signal to the controller 150.

The sound wave transmitter 110 may move horizontally. Accordingly, the thickness may be measured regardless of the position of the metal film 500.

Although not illustrated in the drawing, a plurality of sound wave transmitters 110 may be disposed in the chamber 100, in order to measure the thickness of the metal film 500 at various positions.

The supporter 130 may be disposed at a lower portion of the chamber 100 and may be disposed opposing the sound wave transmitter 110.

The supporter 130 supports the metal film 500 of which a thickness is to be measured. The sound wave transmitted from the sound wave transmitter 110 may be reflected from the metal film 500, disposed on the supporter 130.

The supporter 130 may move horizontally with the metal film 500 disposed on the supporter 130 to measure the thickness of the metal film 500 regardless of the position of the metal film 500.

The supporter 130 may have a constant thickness. Accordingly, the thickness of the metal film 500 may be measured accurately regardless of the position of the supporter.

The supporter 130 may be spaced apart from the sound wave transmitter 110 by a predetermined distance. Specifically, the supporter 130 may oppose and be spaced apart from the sound wave transmitter 110 by a predetermined distance.

The thermometer 140 may be disposed in the chamber 100. Although it is depicted in FIG. 7 that the thermometer 140 is disposed at an upper portion of and in the chamber 100, embodiments are not limited thereto. In an embodiment, the thermometer 140 may be disposed at a lower portion or a central portion of and in the chamber 100. However, the thermometer 140 may not be disposed at the shortest path from the sound wave transmission and receiver 110 to the metal film 500 or the supporter 130.

The thermometer 140 may measure a temperature of the metal film 500 to measure the thickness of the metal film 500 more accurately. In such an embodiment, in order to measure the thickness of the metal film 500 more accurately, the thermometer 140 may move to measure the temperature of the metal film 500. As the temperature increases, a velocity of a sound wave increases, and a thickness resolution of the apparatus for measuring thickness decreases.

The controller 150 is connected to each of the sound wave transmitter 110, the supporter 130, the thermometer 140, and the cooler 200.

The controller 150 receives the sound wave reception signal from the sound wave transmitter 110 and calculates the thickness of the metal film 500 based on a time taken to receive the sound wave reception signal, which will be described in detail below with reference to FIGS. 9 to 11.

The controller 150 may be connected to the sound transmitter 110 and the supporter 130 to control the horizontal movement of the sound wave transmitter 110 and the supporter 130.

The controller 150 may control the cooler 200 according to the temperature control signal received from the thermometer 140 to adjust the temperature in the chamber 100.

The cooler 200 may include a gas pipe 210 and a cooling controller 220.

The gas pipe 210 may be disposed to closely contact an outer surface of the chamber 100 and surround outside of the chamber 100. An ultra-low temperature gas (i.e., cryogenic gas) flows through the gas pipe 210 to cool inside of the chamber 100. Specifically, the ultra-low temperature gas may include various types of gases that exist in the state of gas at extremely low temperatures, e.g., liquid nitrogen ($LN_2$), liquid oxygen ($LO_2$), liquid argon (LAr), liquid hydrogen ($LH_2$), and liquid helium ($LHe_2$).

The cooling controller 220 may be located outside the chamber 100. The cooling controller 220 may be connected to the gas pipe 210 and supply the ultra-low temperature gas to the gas pipe 210 to cool the chamber 210 to an ultra-low temperature. Since a velocity of a sound wave decreases, as the temperature inside the chamber 100 and the temperature of the metal film 500 decrease, as shown in the aforementioned Equation 2, a thickness resolution of the apparatus for measuring thickness according to the present embodiment increases. Accordingly, as the temperature inside the chamber 100 and the temperature of the metal film 500 decrease, the thickness of the metal film 500 may be measured more accurately.

Although not illustrated, the cooling controller 220 may include a gas regulator, a gas valve, a gas storage tank, and the like to supply the ultra-low temperature gas to the gas pipe 210. The gas regulator is configured to finely regulate a flow rate of the ultra-low temperature gas and may be a flow control device such as a mass flow meter. The gas valve is a valve for regulating the opening and closing of the gas storage tank, and the gas storage tank stores the ultra-low temperature gas.

However, the cooler 200 is not limited thereto and may have various forms to lower the temperature in the chamber 100.

Hereinafter, a method for measuring thickness according to a fourth embodiment will be described in detail with reference to FIGS. 9 to 11.

Figure 9:
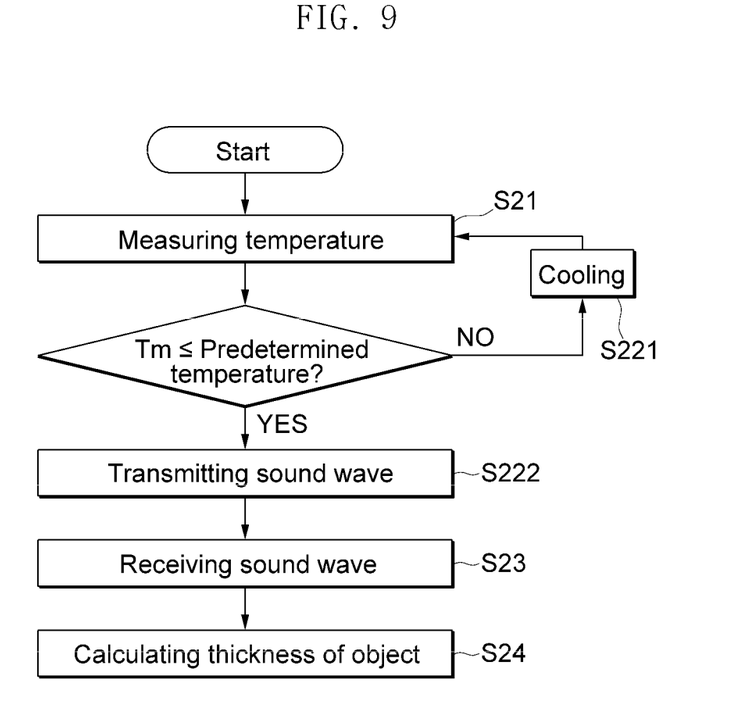
FIG. 9 is a flowchart illustrating a method for measuring thickness according to another embodiment.
Figure 10:
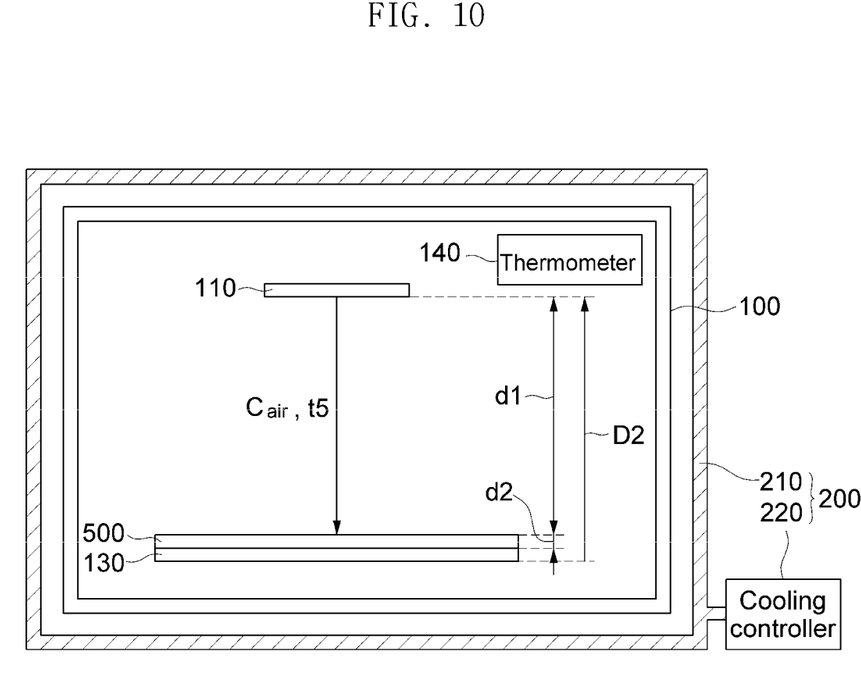
FIGS. 10 to 11 are views illustrating a method for measuring thickness according to another embodiment.
Figure 11:
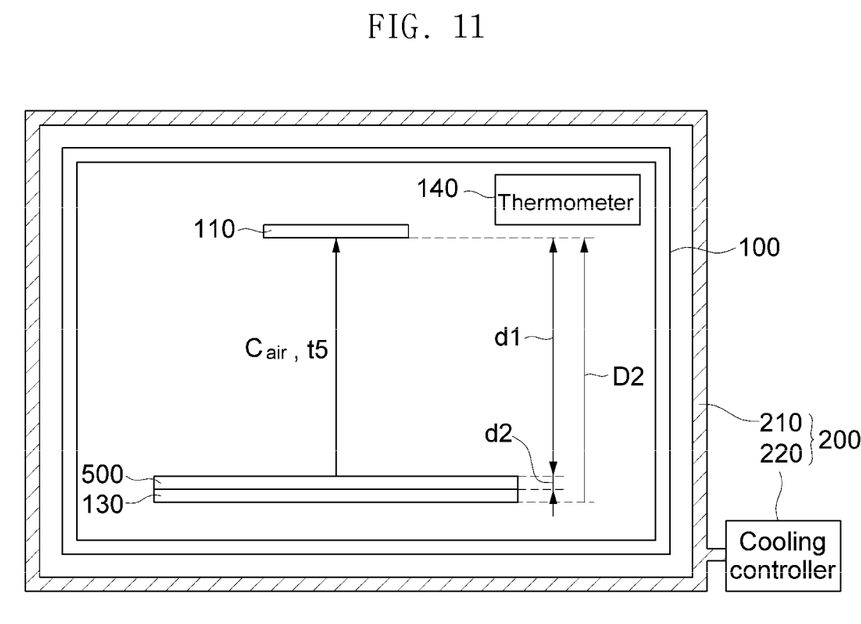

FIG. 9 is a flowchart illustrating a method for measuring thickness according to a fourth embodiment, and FIGS. 10 to 11 are views illustrating a method for measuring thickness according to a fourth embodiment.

Referring to FIGS. 9 and 10, first, a temperature inside the chamber 100 is measured (S21). In such a case, a temperature of the metal film 500 as well as the temperature inside the chamber 100 may be measured.

When the measured temperature of the inside of the chamber 100 is higher than a predetermined temperature (Tm), the controller 150 transmits a temperature control signal to the cooler 200 in order to cool the inside of the chamber 100. According to the temperature control signal received from the controller 150, the cooler 200 cools the inside of the chamber 100 (S221). Specifically, when the measured temperature of the inside of the chamber 100 is higher than about minus 170° C., the controller 150 transmits the temperature control signal to the cooling controller 220. According to the temperature control signal received from the controller 150, the cooling controller 220 controls the gas regulator and the gas valve to supply the ultra-low temperature gas stored in the gas storage tank to the gas pipe 210 surrounding the chamber 100, thereby cooling the inside of the chamber 100.

When the measured temperature of the inside of the chamber 100 is equal to or lower than the predetermined temperature, the sound wave transmitter 110 transmits sound waves (S222). For example, the temperature inside the measured chamber 100 may be substantially equal to or less than about minus 170° C.

Since a thickness d2 of the metal film is calculated on the basis of a sound wave that is transmitted from the sound wave transmitter 110, reflected by the metal film 500 on the supporter 130, and received by the sound wave transmitter 110, the description hereinbelow is given with respect to a sound wave that proceeds along a shortest path, among sound waves transmitted from the sound wave transmitter 110 toward the metal film 500 on the supporter 130. In such a case, a shortest distance D2 from the sound wave transmitter 110 to the metal film 500 on the supporter 130 is a sum of a distance d1 between the sound wave transmitter 110 and an upper surface of the metal film 500 and the thickness d2 of the metal film 500, as represented by the following Equation 5, and has a constant value.

$$D2 = d1 + d2 \qquad \text{[Equation 5]}$$

As illustrated in FIG. 10, a soundwave that is transmitted from the sound wave transmitter 110 travels the distance d1 between the sound wave transmitter 110 and the upper surface of the metal film 500 for a fifth period in time t5 at a velocity Cair of the sound wave in the air.

As illustrated in FIG. 11, the sound wave is reflected from the upper surface of the metal film 500. The sound wave reflected from the upper surface of the metal film 500 travels the distance d1 between the sound wave transmitter 110 and the upper surface of the metal film 500 for the fifth period in time t5 at the velocity Cair of the sound wave in the air.

In such an embodiment, since the inner wall of the chamber 100 of the apparatus for measuring thickness according to a third embodiment includes a sound absorbing material, a sound wave transmitted from the sound wave transmitter 110 is absorbed into the inner wall of the chamber 100. Accordingly, noise generation caused by sound waves transmitted from the sound wave transmitter 110 may be reduced, and the thickness of the metal film 500 may be calculated more accurately.

The sound wave transmitter 110 receives the sound waves reflected from the metal film 500 (S23).

The thickness of the metal film 500 is calculated based on the sound waves received by the sound wave transmitter 110 (S24). Particularly, in order to calculate the thickness of the metal film 500 accurately, the thickness of the metal film 500 is calculated on the basis of a sound wave that proceeds along a shortest path, among sound waves transmitted from the sound wave transmitter 110, reflected from the metal film 500 on the supporter 130, and received by the sound wave transmitter 110. More specifically, the controller 150 calculates the thickness d2 of the metal film 500 based on a shortest time tmin it takes for a sound wave to proceed along a shortest path while being transmitted from the sound wave transmitter 110, reflected from the metal film 500, and received by the sound wave transmitter 110. Specifically, the thickness d2 of the metal film 500 is calculated according to the above-described Equation 5 or the following Equation 6.

$$t_{min} = 2 \times t5 = 2 \times \frac{d1}{C_{air}} \qquad \text{[Equation 6]}$$

According to third and fourth embodiments of the present inventive concept, since a velocity of a sound wave decreases, as the temperature inside the chamber 100 and the temperature of the metal film 500 decrease, a thickness resolution of the apparatus for measuring thickness increases. Accordingly, as the temperature inside the chamber 100 and the temperature of the metal film 500 decrease, the thickness of the metal film 500 may be measured more accurately.

As set forth hereinabove, thickness of an object to be measured may be measured more accurately.

While the present inventive concept has been illustrated and described with reference to the embodiments thereof, it will be apparent to those of ordinary skill in the art that various changes in form and detail may be formed thereto without departing from the spirit and scope of the present inventive concept.

What is claimed is:

1. An apparatus for measuring thickness of an object comprising:
   a chamber;
   a sound wave transmitter transmitting a sound wave in the chamber;
   a sound wave receiver receiving the sound wave transmitted from the sound wave transmitter in the chamber;
   a supporter disposed between the sound wave transmitter and the sound wave receiver, and supporting the object;
   a cooler which cools the chamber at a temperature lower than or equal to about minus 170 degrees Celsius when measuring the thickness of the object; and
   a controller connected to the sound wave receiver and receiving a sound wave reception signal from the sound wave receiver, the controller calculating the thickness of the object.

2. The apparatus for measuring thickness of claim 1, further comprising a thermometer disposed in the chamber.

3. The apparatus for measuring thickness of claim 1, wherein an inner wall of the chamber comprises a sound absorbing material.

4. The apparatus for measuring thickness of claim 1, further comprising a thermometer disposed in the chamber,
   wherein the controller is connected to the sound wave transmitter, the sound wave receiver, the thermometer, and the cooler,
   controls synchronization of the sound wave transmitter and the sound wave receiver, and
   controls the cooler according to a temperature signal received from the thermometer.

5. The apparatus for measuring thickness of claim 1, wherein the sound wave transmitter is spaced apart from the sound wave receiver by a predetermined distance.

6. The apparatus for measuring thickness of claim 1, wherein the sound wave transmitter transmits a sound wave having an audible frequency and the sound wave receiver receives the sound wave having an audible frequency.

7. The apparatus for measuring thickness of claim 1, wherein the supporter is spaced apart from the sound wave receiver by a predetermined distance.

8. The apparatus for measuring thickness of claim 1, wherein the supporter has a hole located corresponding to the sound wave transmitter and the sound wave receiver.

9. The apparatus for measuring thickness of claim 1, further comprising a cooler for cooling the chamber,
   wherein the cooler comprises at least one of liquid nitrogen (LN2), liquid oxygen (LO2), liquid argon (LAr), liquid hydrogen (LH2), and liquid helium (LHe2).

10. A method for measuring thickness, the method comprising:
    cooling a chamber to have a temperature equal to or lower than a predetermined temperature;
    transmitting a sound wave using a sound wave transmitter;
    receiving the sound wave transmitted by the sound wave transmitter using a sound wave receiver; and
    calculating a thickness of a film based on a time difference between the transmitting the sound wave by the sound wave transmitter and the receiving the transmitted sound wave by the sound wave receiver, and the temperature of the chamber,
    the predetermined temperature is about minus 170 degrees Celsius.

11. The method of claim 10, wherein the method further includes absorbing the sound wave transmitted from the sound wave transmitter by a sound absorbing material which is disposed on an inner wall of the chamber.

12. The method of claim 10, wherein the sound wave travels a predetermined distance from the sound wave transmitter to the sound wave receiver.

13. The method of claim 10, wherein the sound wave transmitter transmits a sound wave having an audible frequency, and the sound wave receiver receives the sound wave having an audible frequency.

14. An apparatus for measuring thickness of an object comprising:
    a chamber;
    a sound wave transceiver transmitting a sound wave and receiving the sound wave, and disposed in the chamber;

a thermometer disposed in the chamber;

a supporter disposed to face the sound wave transceiver and supporting the object;

a cooler which cools the chamber at a temperature lower than or equal to about minus 170 degrees Celsius when measuring the thickness of the object; and a controller connected to the sound wave transceiver, the thermometer, and the cooler, and controlling the cooler according to a temperature signal received from the thermometer, the controller calculating the thickness of the object, wherein an inner wall of the chamber comprises a sound absorbing material.

15. The apparatus for measuring thickness of claim 14, wherein the sound wave transceiver transmits and receives a sound wave having an audible frequency.

16. The apparatus for measuring thickness of claim 14, wherein the supporter is spaced apart from the sound wave transceiver by a predetermined distance.

17. A method for measuring thickness, the method comprising:

cooling a chamber to have a temperature equal to or lower than a predetermined temperature;

transmitting a sound wave and receiving the sound wave using a sound wave transceiver; and calculating a thickness of a metal film based on a time difference between the transmitting the sound wave by the sound wave transceiver and the receiving the transmitted sound wave by the sound wave transceiver, and the temperature of the chamber, wherein the predetermined temperature is about minus 170 degrees Celsius.

18. The method of claim 17, wherein the method further includes absorbing the sound wave transmitted from the sound wave transceiver by a sound absorbing material which is disposed on an inner wall of the chamber.

19. The method of claim 17, wherein the method further includes cooling the chamber using a cooler surrounding the chamber.

* * * * *